Oct. 25, 1927.
P. A. E. ARMSTRONG
1,646,947
MEANS FOR PREVENTING DISPLACEMENT IN ROLLERS FOR ROLLER BEARINGS
Filed Oct. 8, 1923
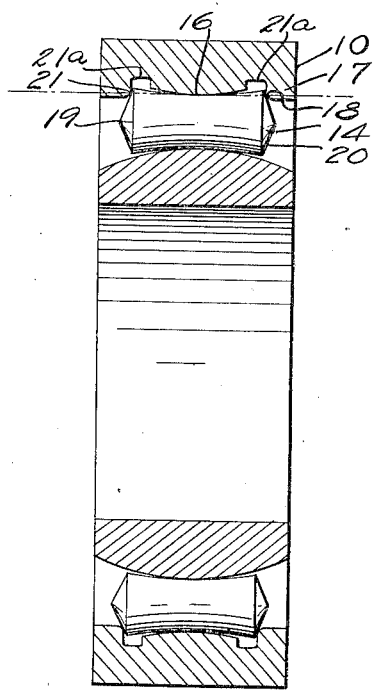
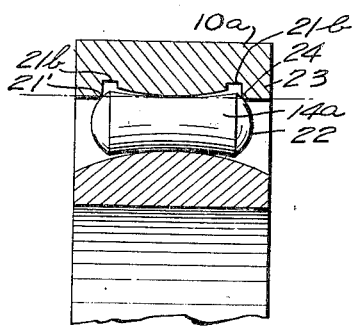
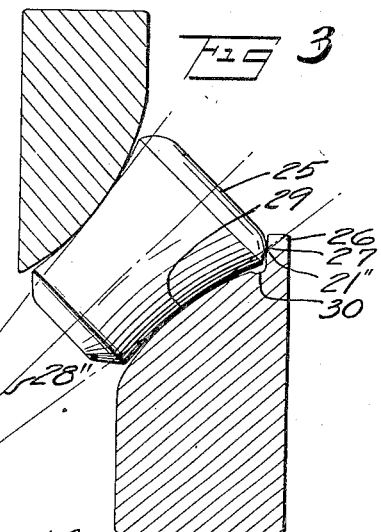
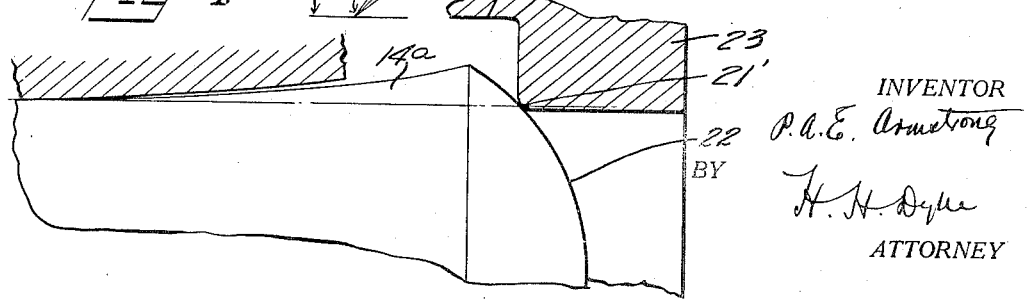
INVENTOR
P. A. E. Armstrong
BY
H. H. Dyke
ATTORNEY Patented Oct. 25, 1927.

1,646,947

UNITED STATES PATENT OFFICE.

PERCY A. E. ARMSTRONG, OF NEW YORK, N. Y.

MEANS FOR PREVENTING DISPLACEMENT IN ROLLERS FOR ROLLER BEARINGS.

Application filed October 8, 1923. Serial No. 667,124.

My invention relates to means for preventing displacement in rollers for roller bearings. The invention relates more particularly to roller bearings having rollers with concavely curved surfaces.

With concavely curved rollers, which have different diameters in different parts of their length, lengthwise displacement thereof relative to a curved bearing surface may result in the introduction, between parts of the bearing rings or members, of a roller section having a diameter greater than the available space. In this way binding or seizing or even breakage of the bearing may result. This tendency becomes more marked as the difference between the curvature of rollers and races is increased.

By the present invention means are provided to prevent longitudinal displacement of the rollers so arranged and disposed that the contact between the roller and the means for preventing endwise displacement thereof is limited entirely or substantially to rolling contact, and sliding and resulting friction and wear are substantially eliminated.

Fig. 1 is a cross-section of a single row roller bearing with concave rollers and embodying one form of the invention, the displacement preventing means being located on the outer bearing ring. Fig. 2 is a view like Fig. 1, except that the rollers have spherical ends. Fig. 3 is a cross-section of a combined thrust and radial bearing with concave rollers and with the displacement preventing means on the interior ring, and Fig. 4 is an enlarged detail view of the form shown in Fig. 2.

The bearings shown for illustration in Figs. 1 and 2 are simple radial bearings with concave rollers. The bearing illustrated in these views has an outer bearing ring 10, with curved bearing surface 11, and an inner bearing ring 12, with a spherical bearing surface. The rollers 14 have the concaved surface 16 with a curvature somewhat greater than the curvature of the bearing members and adapted to make contact with the bearing surfaces of the bearing members in a narrow zone or region. When the bearing is under substantial load such bearing region is increased in width as compared to the condition when not under load, this being due to the elasticity of the metal and such slight "give" as takes place under load, which results in distributing the load over a somewhat wider area. This relation may be referred to, for convenience of statement, as point contact when not under load, and line contact under load. The line contact under load is, however, not of sufficient length to produce appreciable departure from rolling contact over the entire bearing area, nor to result in appreciable sliding action between the surfaces in bearing contact. As will be apparent, the greatest pressures are imposed at and near the center of the line contact area when under load and the contact pressures decrease on either side thereof as the edges or limits of the line contact area are approached.

The means for preventing longitudinal displacement of the rollers in the form shown in Figs. 1 and 2 is provided on the outer bearing ring or member. In Fig. 1 such outer bearing member 10 is provided with inwardly extending flanges 17, which are provided with an outward flare or taper 18, adapted to bear against the end of the roller 14, which is provided with extensions 19 having a similar flare or taper 20. The line of contact 21 is preferably substantially opposite, or in other words at substantially the same radial distance from the bearing center as the bearing region 16 of the roller 14 on the outer bearing member 10, making any contact between the roller and the flange a substantially rolling contact.

The slightly modified form of Fig. 2 has the ends of the rollers 14$^a$ rounded off as shown at 22 and the flanges 23 on bearing member 10$^a$ having contact surfaces 24 of rounded form to cooperate therewith. The relation of the parts is shown in enlarged detail in Fig. 4.

With the forms of Figs. 1 and 2 the material of the outer ring is cut away adjacent to the line of contact 21, 21', as by forming the grooves 21$^a$, 21$^b$. This enables the parts to be machined readily and accurately, and the necessary fit for proper rolling contact to be secured with accuracy.

In Fig. 3 I have shown a combination radial and taper bearing with tapered concave rollers 25, outer bearing ring 25', and inner preferably spherical surface bearing ring 25''. In this instance rolling contact between the roller and displacement preventing flange or abutment 26 and the coacting portion 27 of the rollers is secured by locating the region of contact 21'' substantially on a cone, whose apex 28 is on the bearing axis 28' and also on the roller axis 28", and whose surface includes the load contact line 29. In this way the abutment 26 and rollers 25 meeting on the contact line 21" turn together and make only rolling contact, as in the case of the radial bearing of Figs. 1 and 2. A relief groove 30 is provided so as to facilitate machine work and confine the area of contact to the region in which rolling contact alone is secured. While I have shown the application of my invention to but a small number of forms of bearing, it will be understood that the invention is applicable to bearings of a wide variety of forms. Various forms of cages may be used. Showing of cages is omitted herein to avoid complication of the drawings.

The present case is a continuation in part of my prior copending application serial No. 413,338, filed Sept. 28, 1920, entitled Means for preventing displacement of rollers in roller bearings, patented October 9, 1923, No. 1,469,991.

I claim:

1. In a roller bearing, concavely curved rollers, inner and outer bearing members, said members having convexly curved bearing surfaces, and means on one of the bearing members for making engagement with said rollers at substantially the same radial distance from the bearing axis as the bearing region of the roller to prevent longitudinal displacement of the rollers, and making substantially only rolling engagement therewith.

2. In a combined thrust and radial roller bearing, a spherical inner bearing ring, an outer bearing ring, tapered concavely curved rollers therebetween, and means on one of the bearing rings for preventing undue endwise movement of the rollers and making substantially only rolling contact therewith.

PERCY A. E. ARMSTRONG.